(12) United States Patent
Hoppus (10) Patent No.: US 8,833,570 B2
(45) Date of Patent: Sep. 16, 2014

(54) MOUNTING SYSTEM FOR SPORTING EQUIPMENT

(75) Inventor: Adam D. Hoppus, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 134 days.

(21) Appl. No.: 13/273,564

(22) Filed: Oct. 14, 2011

(65) Prior Publication Data
US 2013/0091681 A1    Apr. 18, 2013

(51) Int. Cl.
| A63B 71/00 | (2006.01) |
| A63C 17/00 | (2006.01) |
| B23P 17/04 | (2006.01) |
| A63C 17/01 | (2006.01) |

(52) U.S. Cl.
CPC ............ *A63B 71/0036* (2013.01); *A63C 17/01* (2013.01); *A63C 17/0013* (2013.01); *A63C 17/0006* (2013.01); *B23P 17/04* (2013.01); *A63C 2203/44* (2013.01)
USPC ....... 211/63; 211/70.5; 211/85.7; 248/225.11

(58) Field of Classification Search
CPC .................................................. A63B 71/0036
USPC ............. 472/118; 248/220.1, 225.11, 223.21, 248/690; 211/60.1, 63, 64, 65, 66, 68, 70.2, 211/70.5, 70.7, 70.8, 85.7, 87.01, 89.01, 211/70.6
See application file for complete search history.

(56) References Cited

U.S. PATENT DOCUMENTS

| 3,527,354 | A |   | 9/1970  | Sokolow              |
| 4,915,338 | A | * | 4/1990  | Guth ............................. 248/250 |
| D312,017  | S |   | 11/1990 | Gould                |
| D329,563  | S | * | 9/1992  | Rasmussen ................... D6/552 |
| 5,301,818 | A |   | 4/1994  | Dix                  |
| 5,305,897 | A | * | 4/1994  | Smith .......................... 211/85.7 |
| 5,307,585 | A | * | 5/1994  | Thompson .................... 43/21.2 |
| 5,833,079 | A |   | 11/1998 | Roberts              |
| D455,310  | S | * | 4/2002  | Webber .......................... D6/552 |

(Continued)

OTHER PUBLICATIONS

Jodeska, "Customised Skateboard Shelves," pp. 1-3, http://jodeska.blogspot.com/2010/04/customised-skateboard-shelves.html (last visited Jun. 27, 2011).

(Continued)

*Primary Examiner* — David Bryant
*Assistant Examiner* — Steven A Maynard
(74) *Attorney, Agent, or Firm* — Leanne Taveggia Farrell; Westman, Champlin & Koehler, P.A.

(57) ABSTRACT

A mounting system includes a first wall mount and a second wall mount. The first wall mount includes a first protruding flange having a top edge, a bottom edge, a front edge and a slot defined by an upper edge that intersects with the top edge of the protruding flange, a lower edge that intersects with the front edge of the protruding flange, a coupling edge that couples the upper edge to the lower edge. The second wall mount including a second protruding flange having a top edge, a bottom edge, a front edge and a slot defined by an upper edge that intersects with the top edge of the protruding flange, a lower edge that intersects with the front edge of the protruding flange, and a coupling edge that couples the upper edge to the lower edge. Sporting equipment can be deposited in the slots in at least two different configurations.

19 Claims, 11 Drawing Sheets

(56) References Cited

U.S. PATENT DOCUMENTS

| | | | |
|---|---|---|---|
| D469,293 S * | 1/2003 | Harms | D6/552 |
| D469,294 S * | 1/2003 | Harms et al. | D6/552 |
| D472,091 S | 3/2003 | Bell | |
| 6,604,639 B2 | 8/2003 | Chen | |
| 6,640,978 B2 | 11/2003 | Reiser et al. | |
| 6,712,226 B1 | 3/2004 | Williams, Jr. | |
| D492,742 S * | 7/2004 | Harms et al. | D21/684 |
| D499,594 S | 12/2004 | Laitila | |
| 6,935,517 B1 * | 8/2005 | Reed et al. | 211/85.7 |
| 6,938,864 B2 | 9/2005 | Simonian et al. | |
| 7,014,052 B2 * | 3/2006 | Dettorre et al. | 211/85.7 |
| 7,213,713 B2 | 5/2007 | Matsui | |
| 7,284,671 B1 | 10/2007 | Doscher | |
| D556,485 S | 12/2007 | Allain | |
| 2005/0233872 A1 * | 10/2005 | Harms | 482/104 |
| 2007/0062992 A1 * | 3/2007 | Hepworth et al. | 224/406 |
| 2010/0307996 A1 | 12/2010 | Kahn | |

OTHER PUBLICATIONS

Etsy, "Skateboard Wall Mounted Storage Rack (4) Space Angle," pp. 1-3, http://www.etsy.com/transaction/35671426 (last visited Jun. 27, 2011).

Garage Envy, "Garage Storage Accessories for Ski, Snow, Skate, Slatwall Storage," pp. 1-2, http://www.garageenvy.com/Ski-Snow-Skate.htm (last visited Jun. 27, 2011).

Craftwoodracks, "4 Skateboard Rack Floor," pp. 1-3, http://craftwoodracks.com/4skateboardfloorrack.aspx (last visited Jun. 27, 2011).

Office Action from Canadian Patent Application No. 2,769,804, mailed Jun. 20, 2012 (3 pages).

Office Action from Canadian Patent Application No. 2,769,804, mailed Jan. 17, 2013 (2 pages).

* cited by examiner

MOUNTING SYSTEM FOR SPORTING EQUIPMENT

BACKGROUND

To free up floor space or storage space and prevent damage, users and retailers hang sporting equipment on racks for display or storage. For example, skis, snowboards, skateboards and surfboards are all pieces of elongated sporting equipment that take up significant space and are costly to replace if they become damaged. In addition, these types of sporting equipment include design components and aesthetic detailing, which, if not raised to eye level, would not be otherwise appreciated.

The discussion above is merely provided for general background information and is not intended to be used as an aid in determining the scope of the claimed subject matter.

SUMMARY

A mounting system for sporting equipment includes a first wall mount and a second wall mount. The first wall mount includes a first faceplate attached to a first protruding flange of a first base member and the second wall mount includes a second faceplate attached to a second protruding flange of a second base member. Both the first and second protruding flanges include top edges, bottom edges, front edges and slots for receiving sporting equipment. The slots are defined by upper edges that intersect with the top edges of the protruding flanges, lower edges that intersect with the front edges of the protruding flanges, and coupling edges that couple the upper edges to the lower edges. Both the first and second faceplates also include slots that correspond with the slots of the protruding flanges.

In one embodiment, the upper edges of the slots intersect with the top edges of the protruding flanges and faceplates at a first angle, while the lower edges of the slots intersect with the front edges of the protruding flanges and faceplates at a second angle. The sum of the first angle and the second angle is substantially equal to 90 degrees.

In another embodiment, the lower edges of the slots have lengths that are less than lengths of the corresponding upper edges.

In yet another embodiment, the first wall mount and the second wall mount can be mounted to a support structure in two different configurations. In a first configuration, side edges of the first wall mount and the second wall mount are in contact with each other in order to display sporting equipment in a vertical orientation. In a second configuration, side edges of the first wall mount and the second wall mount are located a spaced distance from each other in order to display sporting equipment in a horizontal orientation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Embodiments of the disclosure describe a mounting or display system for sporting equipment that can be used in a variety of applications. For example, an owner or user of sporting equipment can use the mounting system to store and display sporting equipment in a domestic environment. In another example, a retail store can use the mounting system to display sporting equipment for purchase.

The disclosed mounting system is attached to a support structure (e.g., a wall or wall fixture) to both store and display sporting equipment, such as a skateboard, a surfboard or a snowboard. The mounting system includes two wall mounts. The two wall mounts can be mounted to the support structure in two configurations. In a first configuration, side edges of the two wall mounts are in contact with each other so as to receive and display an elongated portion of the sporting equipment in a vertical direction. In a second configuration, the two wall mounts are separated from each other by a spaced distance so as to receive and display the elongated portion of the sporting equipment in a horizontal direction.

Figure 8:
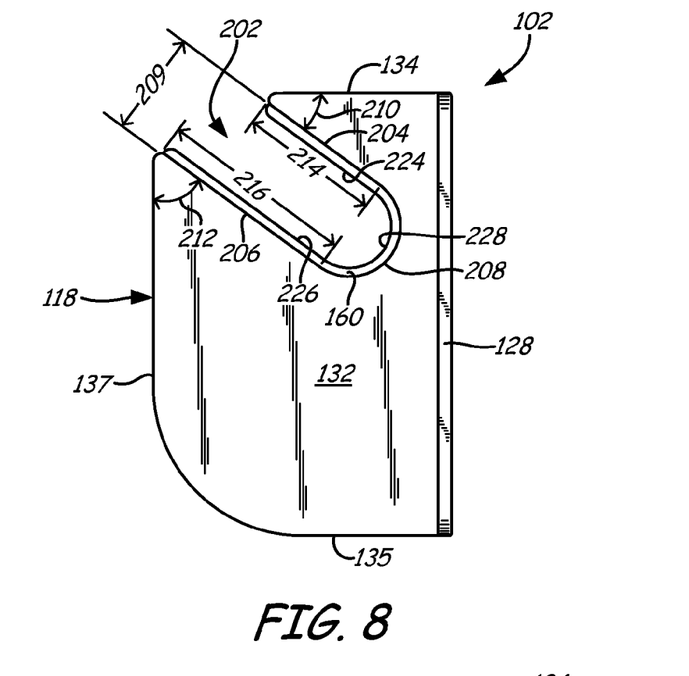
FIG. 8 illustrates a right side view of a first wall mount of the mounting system illustrated in FIG. 1.
Figure 9:
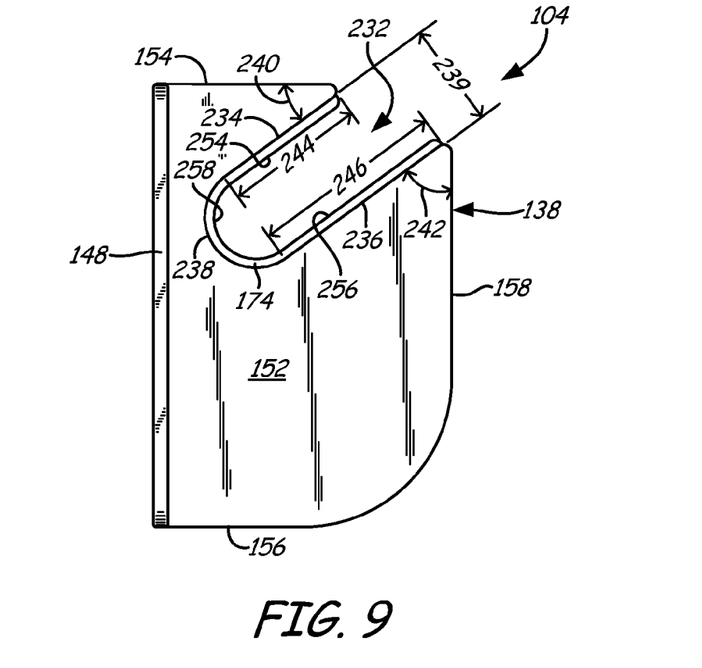
FIG. 9 illustrates a left side view of a second wall mount of the mounting system illustrated in FIG. 1.

FIGS. 1-7 illustrate perspective, front, back, left side, right side, top and bottom views of a first configuration of mounting or display system 100 according to one embodiment. FIG. 8 illustrates a right side view of the first wall mount 102 of the mounting system 100 and FIG. 9 illustrates a left side view of the second wall mount 104 of the mounting system 100. FIGS. 11-17 illustrate perspective, front, back, left side, right side, top and front views of a second configuration of the mounting system 100 according to another embodiment.

Mounting system or display system 100 includes a first wall mount 102 and a second wall mount 104. First wall mount 102 includes a first base member or support piece 106 and a first faceplate or end piece 108. Second wall mount 104 includes a second base member or support piece 110 and a second faceplate or end piece 112. For each wall mount 102 and 104, the faceplates 108 and 112 are attached to the base members 106 and 110 and the base members 106 and 110 are attached or mounted to a support structure 114, such as a wall.

First base member or first support piece 106 of first wall mount 102 is formed of a single, continuous material, such as aluminum. First base member 106 includes a mounting portion or mounting flange 116 and a receiving portion or protruding flange 118. Mounting portion 116 is configured to mount to support structure 114. In one embodiment, mounting portion 116 mounts to support structure 114 using a pair of screws, which extend through a pair of screw holes 117 that extend from a mounting surface 120 to an opposing surface 122. Mounting portion 116 is substantially perpendicular to receiving portion 118 and extends in a rightward direction from receiving portion 118. Mounting portion 116 is defined by mounting surface 120, opposing surface 122, a top edge 124, a bottom edge 126 and a side edge 128. As illustrated, at least a portion of top edge 124 and bottom edge 126 have straight portions and at least a portion of top edge 124 and bottom edge 126 are curved. The curved portions of top edge 124 and bottom edge 126 intersect with side edge 128. In addition, the straight portions of top edge 124 and bottom edge 126 as well as mounting surface 120 and opposing surface 122 intersect with receiving portion 118 and are substantially perpendicular to receiving portion 118.

Receiving portion 118 is defined by a leftward facing surface or outwardly facing surface 130, a rightward facing surface or inwardly facing surface 132, a top edge 134, a bottom edge 135 and a front edge 137. As illustrated, at least a portion of bottom edge 135 is curved. The curved portion of bottom edge 135 intersects with front edge 137, while the straight portion of bottom edge 135 is substantially parallel with top edge 134 and substantially perpendicular with front edge 137. In addition, top edge 134 and the straight portion of bottom edge 135 as well as leftward facing surface 130 and rightward facing surface 132 intersect with mounting portion 116. In particular, leftward facing surface 130 intersects with mounting surface 120 and rightward facing surface 132 intersects with opposing surface 122.

Second base member or second support piece 110 of second wall mount 104 is also formed of a single, continuous material, such as aluminum. Second base member 110 includes a mounting portion or mounting flange 136 and a receiving portion or protruding flange 138. Mounting portion 136 is configured to mount to support structure 114. In one embodiment, mounting portion 136 mounts to support structure 114 using a pair of screws, which extend through a pair of screw holes 127 that extend from a mounting surface 140 to an opposing surface 142. Mounting portion 136 is substantially perpendicular to receiving portion 138 and extends in a leftward direction from receiving portion 138. Mounting portion 136 is defined by mounting surface 140, opposing surface 142, a top edge 144, a bottom edge 146 and a side edge 148. As illustrated, at least a portion of top edge 144 and bottom edge 146 have straight portions and at least a portion of top edge 144 and bottom edge 146 are curved. The curved portions of top edge 144 and bottom edge 146 intersect with side edge 148. In addition, the straight portions of top edge 144 and bottom edge 146 as well as mounting surface 140 and opposing surface 142 intersect with receiving portion 138.

Receiving portion 138 is defined by a rightward facing surface or outwardly facing surface 150, a leftward facing surface or inwardly facing surface 152, a top edge 154, a bottom edge 156 and a front edge 158. As illustrated, at least a portion of bottom edge 156 is curved. The curved portion of bottom edge 156 intersects with front edge 158, while the straight portion of bottom edge 156 is substantially parallel with top edge 154 and substantially perpendicular with front edge 158. In addition, top edge 154 and the straight portion of bottom edge 156 as well as rightward facing surface 150 and leftward facing surface 152 intersect with mounting portion 136. In particular, rightward facing surface 150 intersects with mounting surface 140 and leftward facing surface 152 intersects with opposing surface 142.

Figure 1:
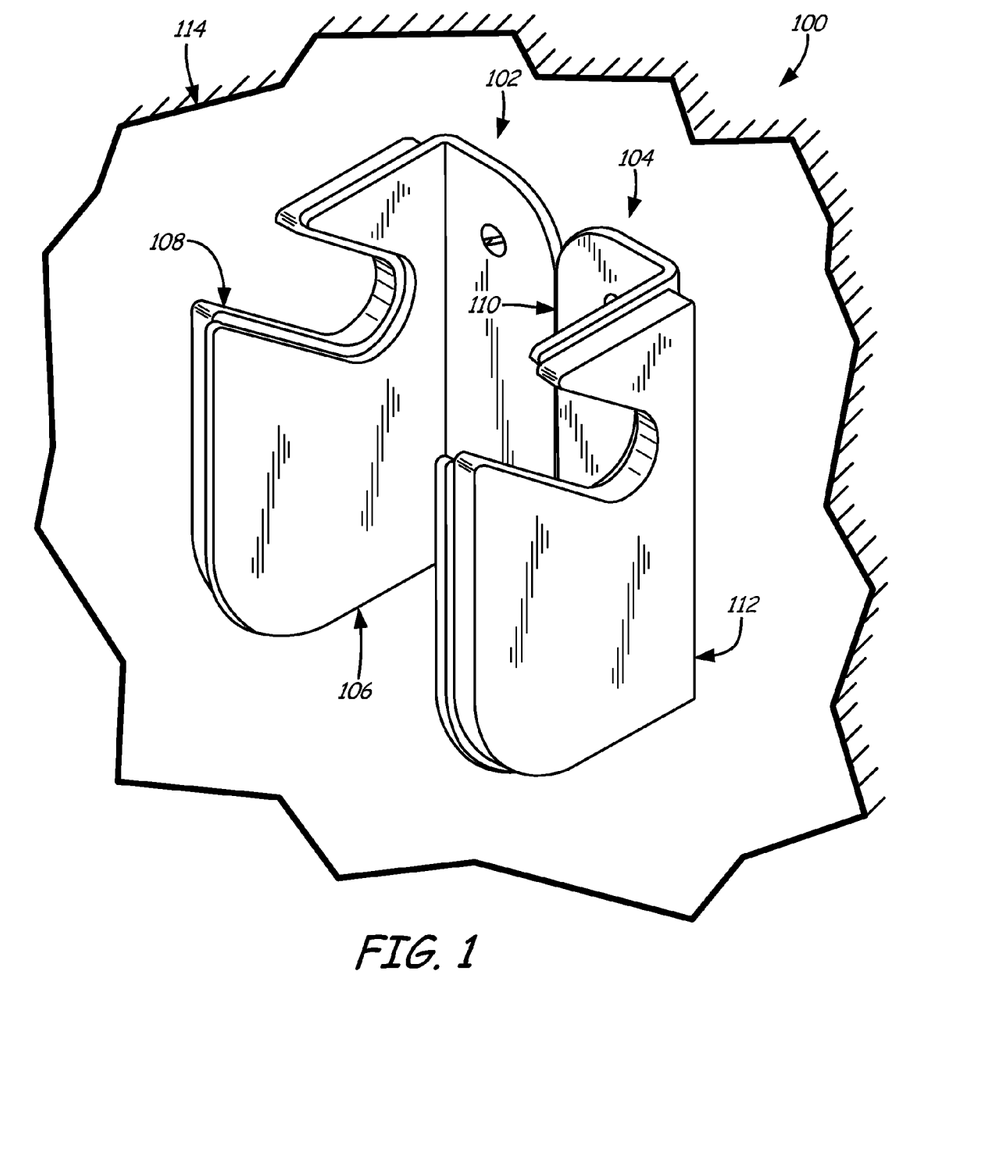
FIG. 1 illustrates a perspective view of a first configuration of a mounting system according to one embodiment.
Figure 2:
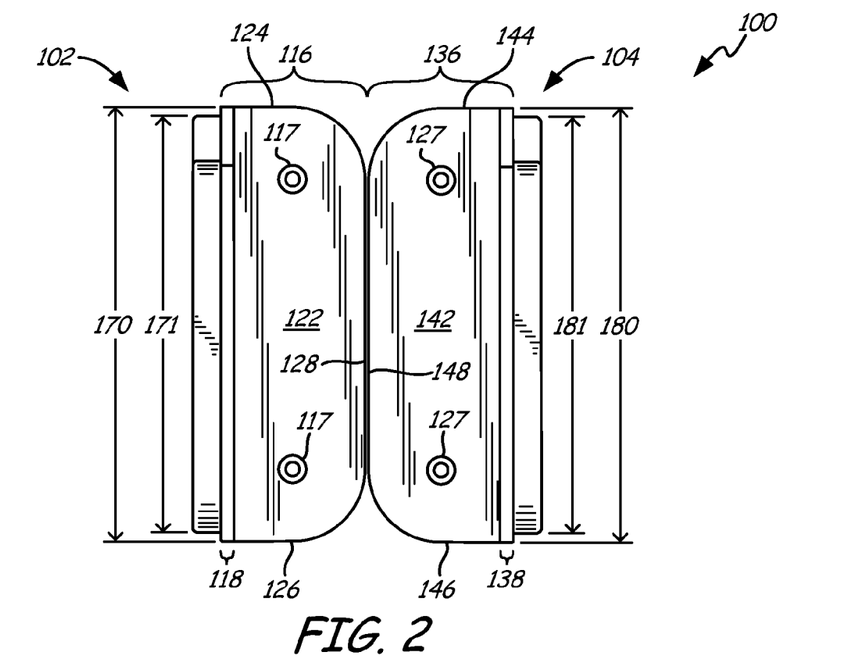
FIG. 2 illustrates a front view of the first configuration of the mounting system illustrated in FIG. 1.
Figure 3:
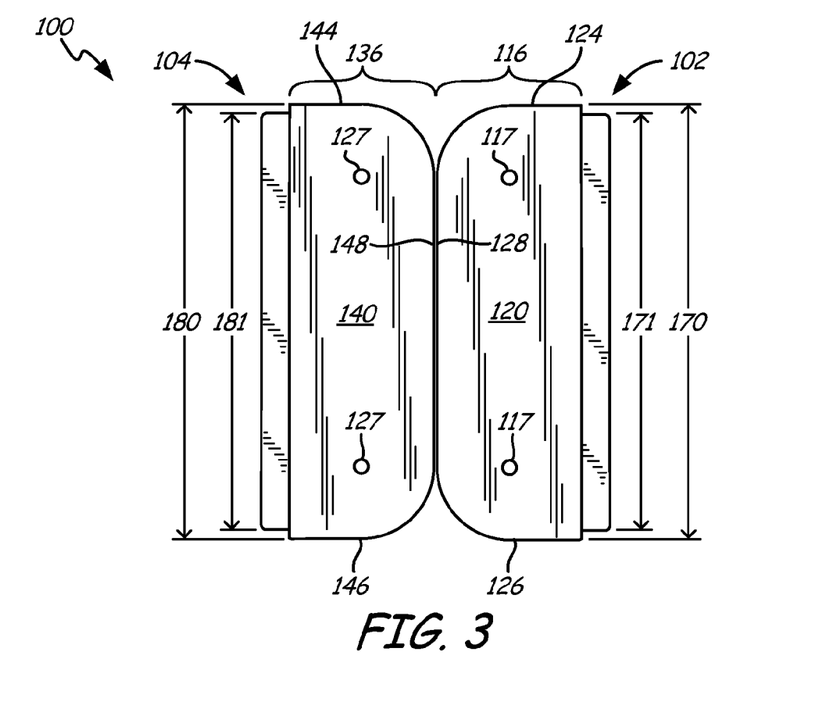
FIG. 3 illustrates a back view of the first configuration of the mounting system illustrated in FIG. 1.
Figure 4:
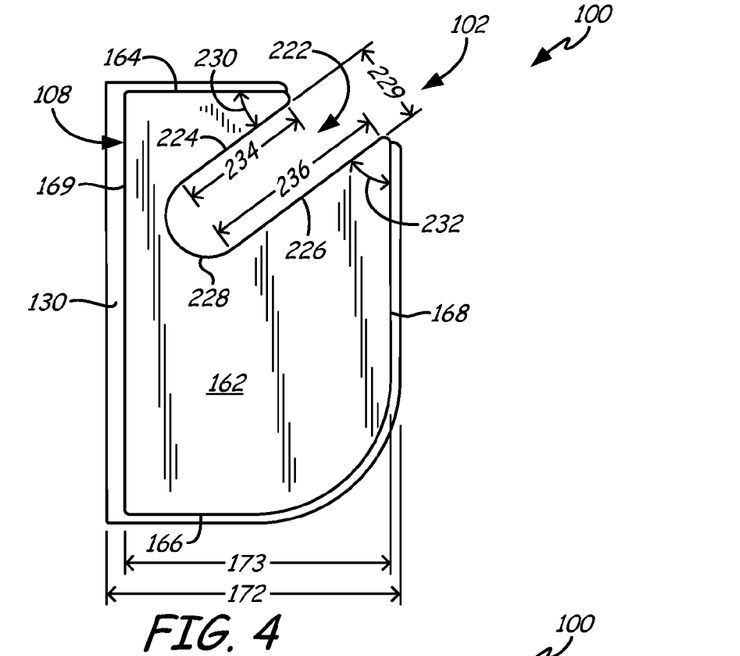
FIG. 4 illustrates a left side view of the first configuration of the mounting system illustrated in FIG. 1.

First faceplate or first end piece 108 of first wall mount 102 is formed of a single, continuous material, such as wood or a composite wood material. First faceplate 108 is attached to leftward facing surface 130 of receiving portion 118 of first base member 106. In particular, first faceplate 108 includes a mounting surface 160, an opposing surface 162, a top edge 164, a bottom edge 166, a front edge 168 and a back edge 169. Mounting surface 160 of first faceplate 108 is directly attached or coupled to leftward facing surface 130 of first base member 106 by a fastener, such as an adhesive. As illustrated, the shapes of the edges of first faceplate 108 correspond with the shape of the edges of receiving portion 118 of first base member 106. In particular, at least a portion of bottom edge 166 is curved. The curved portion of bottom edge 166 intersects with front edge 168. In addition, back edge 169 is substantially perpendicular to and intersects with top edge 164 and back edge 169 is substantially perpendicular to and intersects with bottom edge 166. However, the edges of first faceplate 108 have dimensions that are less than the dimensions of receiving portion 118. For example, a height 170 of receiving portion 118 is greater than a height 171 of first faceplate 108 and a depth 172 of receiving portion 118 is greater than a depth 173 of first faceplate 108. Therefore, from a left side view, as illustrated in FIG. 4, portions of leftward facing surface 130 of receiving portion 118 are visible.

Figure 5:
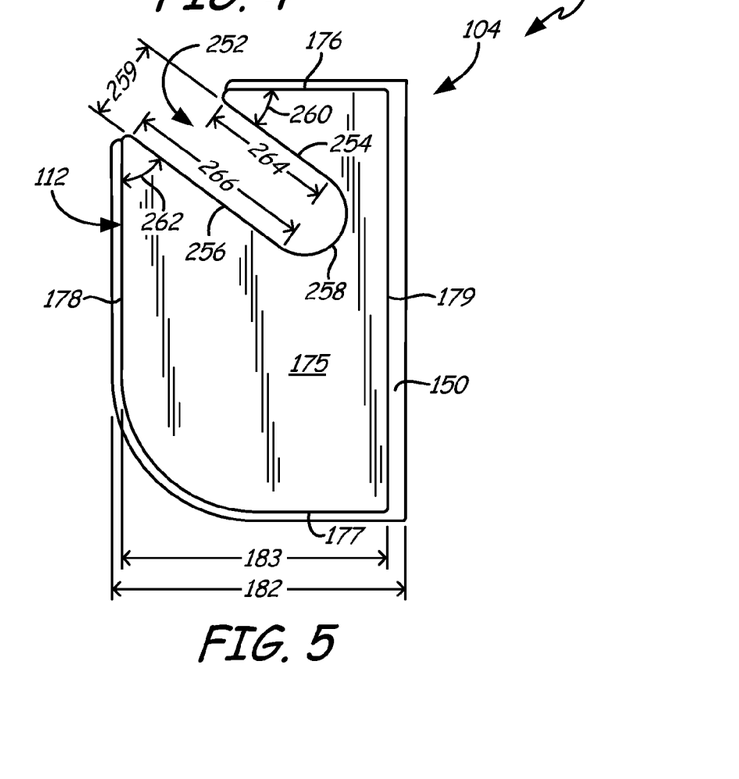
FIG. 5 illustrates a right side view of the first configuration of the mounting system illustrated in FIG. 1.
Figure 6:
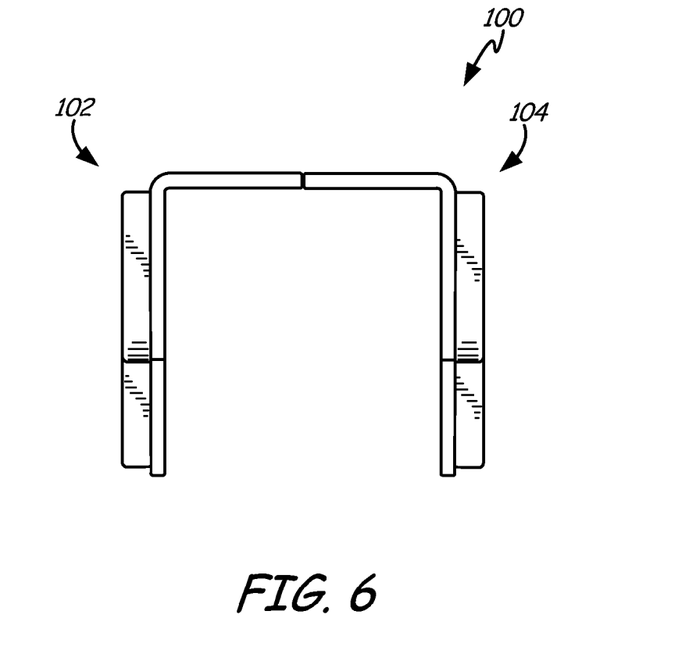
FIG. 6 illustrates a top view of the first configuration of the mounting system illustrated in FIG. 1.
Figure 7:
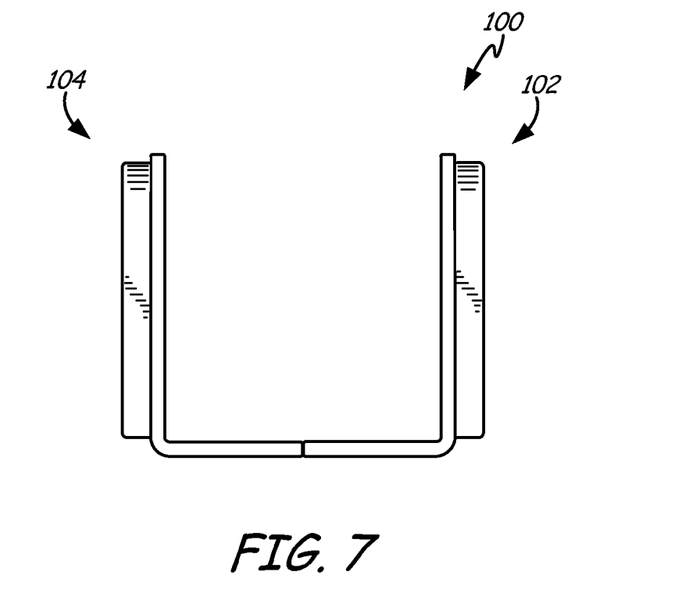
FIG. 7 illustrates a bottom view of the first configuration of the mounting system illustrated in FIG. 1.

Second faceplate 112 of second wall mount 104 is formed of a single, continuous material, such as wood or a composite wood material. Second faceplate 112 is attached to rightward facing surface 150 of receiving portion 138 of second base member 110. In particular, second faceplate 112 includes a mounting surface 174, an opposing surface 175, a top edge 176, a bottom edge 177, a front edge 178 and a back edge 179. Mounting surface 174 of second faceplate 112 is directly attached or coupled to rightward facing surface 150 of first base member 110 by a fastener, such as an adhesive. As illustrated, the shapes of the edges of second faceplate 112 correspond with the shape of the edges of receiving portion 138 of second base member 110. In particular, at least a portion of bottom edge 177 is curved. The curved portion of bottom edge 177 intersects with front edge 178. In addition, back edge 179 is substantially perpendicular to and intersects with top edge 176 and back edge 179 is substantially perpendicular to and intersects with bottom edge 177. However, the edges of second faceplate 112 have dimensions that are less than the dimensions of receiving portion 138. For example, a height 180 of receiving portion 138 is greater than a height 181 of second faceplate 112 and a depth 182 of receiving portion 138 is greater than a depth 183 of second faceplate 112. Therefore, from a right side view, as illustrated in FIG. 5, portions of rightward facing surface 150 of receiving portion 138 are visible.

Receiving portion or protruding flange 118 of first base member or first support piece 106 includes a receiving slot 202. Receiving slot 202 is configured to receive sporting equipment for display and/or storage. Receiving slot 202 is defined by an upper edge 204, a lower edge 206 and a connecting edge 208. Upper edge 204 is a straight edge and intersects with top edge 134 of receiving portion 118 at a first angle 210. Lower edge 206 is a straight edge and intersects with front edge 137 of receiving portion 118 at a second angle 212. Connecting edge 208 connects upper edge 204 to lower edge 206 and, in one embodiment, is curved. However, in other embodiments connecting edge 208 can be straight or include a plurality of straight edges. Regardless, connecting edge 208 allows upper edge 204 to be located a spaced distance 209 from lower edge 206. For example, spaced distance 209 can be substantially equal to 1.375 inches.

In one embodiment, the sum of the first angle 210 and the second angle 212 is substantially equal to 90 degrees. In still another embodiment, second angle 212 is greater than first angle 210. For example, first angle 210 can be substantially equal to 53 degrees and second angle 212 can be substantially equal to 37 degrees. Upper edge 204 of receiving slot 202 of receiving portion 118 includes a length 214. Lower edge 206 of receiving slot 202 of receiving portion 118 includes a length 216. Length 216 of lower edge 206 is greater than length 214 of upper edge 204.

First faceplate or first end piece 108 of first wall mount 102 also includes a receiving slot 222. Receiving slot 222 is similar to receiving slot 202 of receiving portion 118 and is configured to correspond with receiving slot 202 when the first faceplate or first end piece 108 is attached to leftward facing surface or outwardly facing surface 130 of receiving portion 118. Therefore, receiving slot 222 is also configured to receive the sporting equipment for display and/or storage. Receiving slot 222 is defined by an upper edge 224, a lower edge 226 and a connecting edge 228. Upper edge 224 is a straight edge and intersects with top edge 164 of first faceplate 108 at a first angle 230. Lower edge 226 is a straight edge and intersects with front edge 168 of first faceplate 108 at a second angle 232. Connecting edge 228 connects upper edge 224 to lower edge 226 and, corresponds with the connecting edge 208 of receiving portion 118. Connecting edge 228 allows upper edge 224 to be located a spaced distance 229 from lower edge 226. For example, spaced distance 229 can be substantially equal to 1.125 inches.

In one embodiment, the sum of the first angle 230 and the second angle 232 is substantially equal to 90 degrees. In still another embodiment, second angle 232 is greater than first angle 230. For example, first angle 230 can be substantially equal to 53 degrees and second angle 232 can be substantially equal to 37 degrees. Upper edge 224 of receiving slot 222 of first faceplate 108 includes a length 234. Lower edge 226 of receiving slot 222 of first faceplate 108 includes a length 236. Length 236 of lower edge 226 is greater than length 234 of upper edge 224.

While slot 202 of receiving portion 118 corresponds with slot 222 of first faceplate 108, slots 202 and 222 are not aligned as evidenced by the difference in spaced distances 209 and 229, the difference in lengths 214 and 234 and the difference in lengths 216 and 236. In particular, spaced distance 209 of slot 202 is greater than spaced distance 229 of slot 222, length 214 is greater than length 234 and length 216 is greater than length 236. Therefore, and as illustrated in FIGS. 4 and 8, the surface area of upper edge 224, lower edge 226 and connecting edge 228 of first faceplate 108 are the components that are in contact with sporting equipment when received by slots 202 and 222.

Receiving portion or protruding flange 138 of second base member or second support piece 110 includes a receiving slot 232. Receiving slot 232 is configured to receive sporting equipment for display and/or storage. Receiving slot 232 is defined by an upper edge 234, a lower edge 236 and a connecting edge 238. Upper edge 234 is a straight edge and intersects with top edge 154 of receiving portion 138 at a first angle 240. Lower edge 236 is a straight edge and intersects with front edge 158 of receiving portion 138 at a second angle 242. Connecting edge 238 connects upper edge 234 to lower edge 236 and, in one embodiment, is curved. However, in other embodiments connecting edge 238 can be straight or include a plurality of straight edges. Regardless, connecting edge 238 allows upper edge 234 to be located a spaced distance 239 from lower edge 236. For example, spaced distance 239 can be substantially equal to 1.375 inches.

In one embodiment, the sum of the first angle 240 and the second angle 242 is substantially equal to 90 degrees. In still another embodiment, second angle 242 is greater than first angle 240. For example, first angle 240 can be substantially equal to 53 degrees and second angle 242 can be substantially equal to 37 degrees. Upper edge 234 of receiving slot 232 of receiving portion 138 includes a length 244. Lower edge 236 of receiving slot 232 of receiving portion 138 includes a length 246. Length 246 of lower edge 236 is greater than length 244 of upper edge 234.

Second faceplate or second end piece 112 of second wall mount 104 also includes a receiving slot 252. Receiving slot 252 is similar to receiving slot 232 of receiving portion 138 and is configured to correspond with receiving slot 232 when the second faceplate or second end piece 112 is attached to rightward facing surface or outwardly facing surface 150 of receiving portion 138. Therefore, receiving slot 252 is also configured to receive the sporting equipment for display and/or storage. Receiving slot 252 is defined by an upper edge 254, a lower edge 256 and a connecting edge 258. Upper edge 254 is a straight edge and intersects with top edge 176 of second faceplate 112 at a first angle 260. Lower edge 256 is a straight edge and intersects with front edge 178 of second faceplate 112 at a second angle 262. Connecting edge 258 connects upper edge 254 to lower edge 256 and, corresponds with the connecting edge 238 of receiving portion 138. Connecting edge 258 allows upper edge 254 to be located a spaced distance 259 from lower edge 256. For example, spaced distance 259 can be substantially equal to 1.125 inches.

In one embodiment, the sum of the first angle 260 and the second angle 262 is substantially equal to 90 degrees. In still another embodiment, second angle 262 is greater than first angle 260. For example, first angle 260 can be substantially equal to 53 degrees and second angle 262 can be substantially equal to 37 degrees. Upper edge 254 of receiving slot 252 of second faceplate 112 includes a length 264. Lower edge 256 of receiving slot 252 of first faceplate 112 includes a length 266. Length 266 of lower edge 256 is greater than length 264 of upper edge 254.

While slot 232 of receiving portion 138 corresponds with slot 252 of second faceplate 112, slots 232 and 252 are not aligned as evidenced by the difference in spaced distances 239 and 259, the difference in lengths 244 and 264 and the difference in lengths 246 and 266. In particular, spaced distance 239 of slot 232 is greater than spaced distance 259 of slot 252, length 244 is greater than length 264 and length 246 is greater than length 266. Therefore, and as illustrated in FIGS. 5 and 9, the surface area of upper edge 254, lower edge 256 and connecting edge 258 of second faceplate 112 are the components that are in contact with sporting equipment when received by slots 232 and 252.

Figure 10:
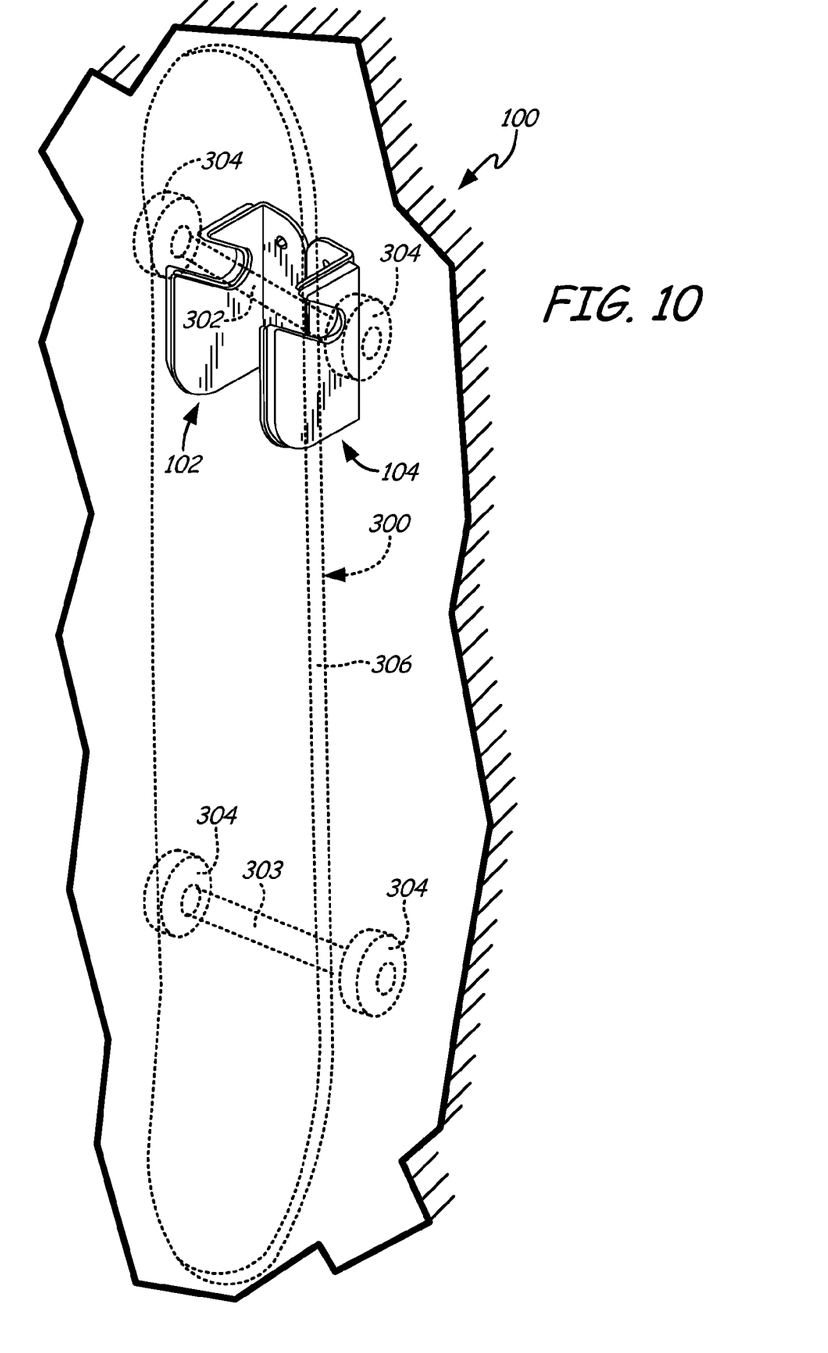
FIG. 10 illustrates a perspective view of the first configuration of the mounting system illustrated in FIG. 1 with exemplary sporting equipment being supported by the mounting system.
Figure 11:
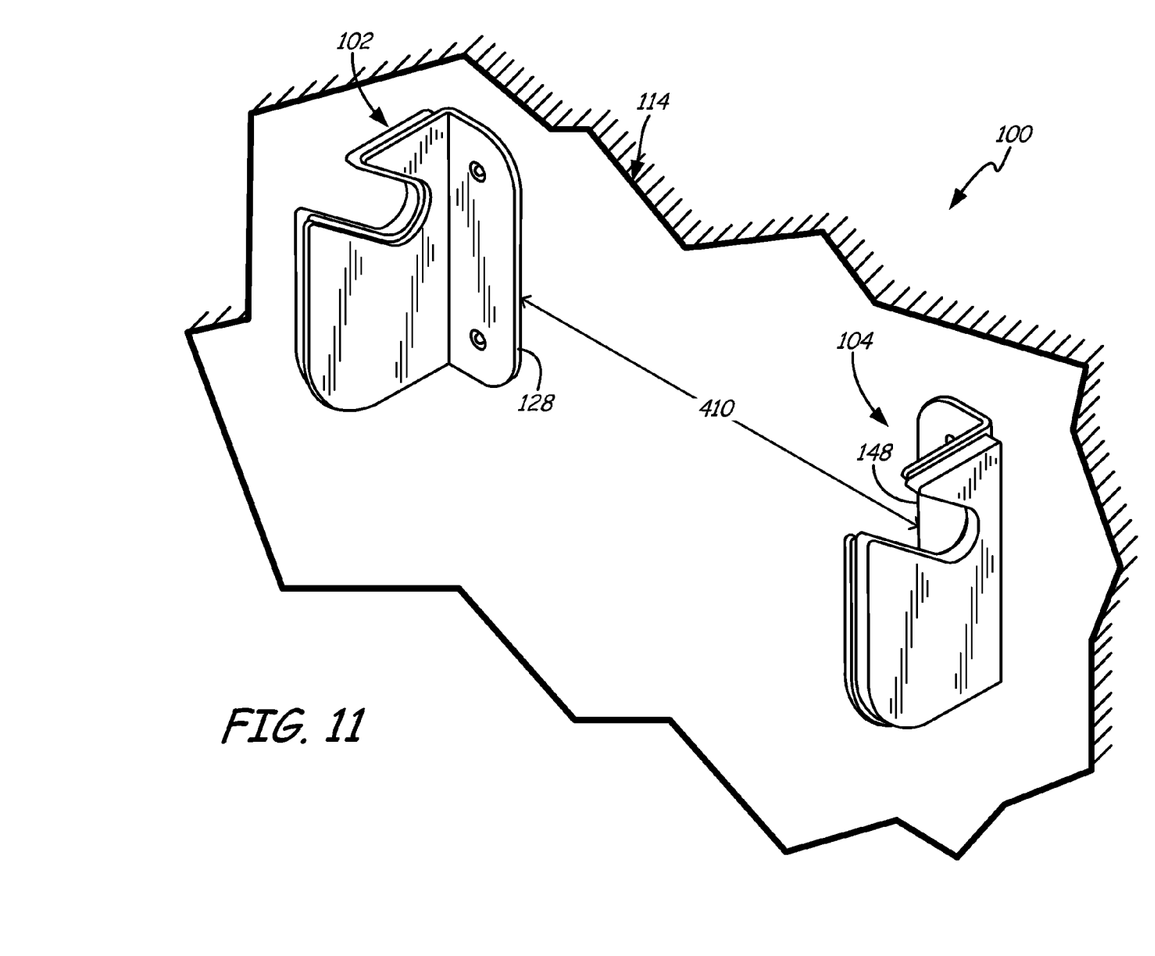
FIG. 11 illustrates a perspective view of a second configuration of a mounting system according to one embodiment.
Figure 12:
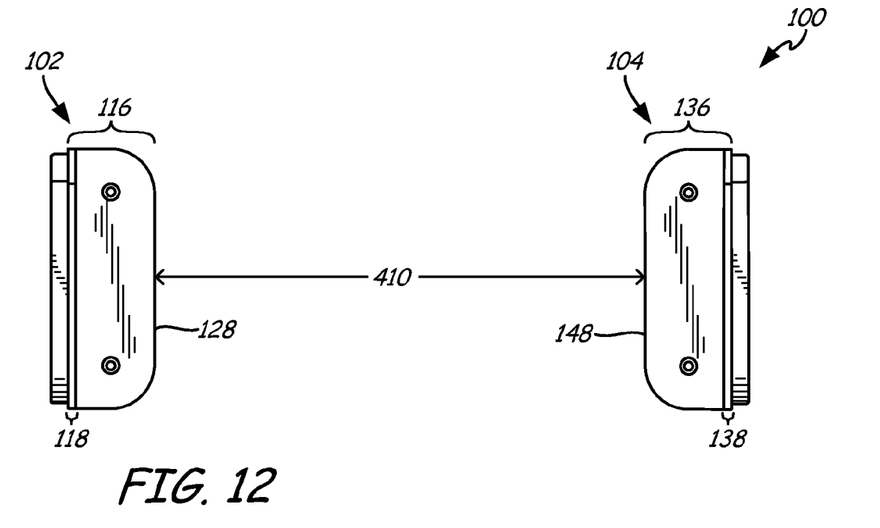
FIG. 12 illustrates a front view of the second configuration of the mounting system illustrated in FIG. 11.
Figure 13:
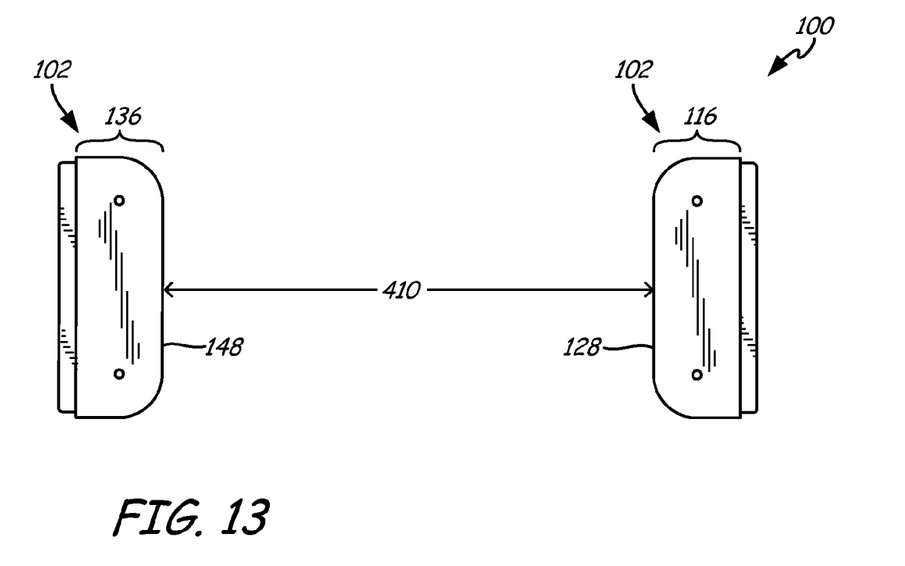
FIG. 13 illustrates a back view of the second configuration of the mounting system illustrated in FIG. 11.
Figure 14:
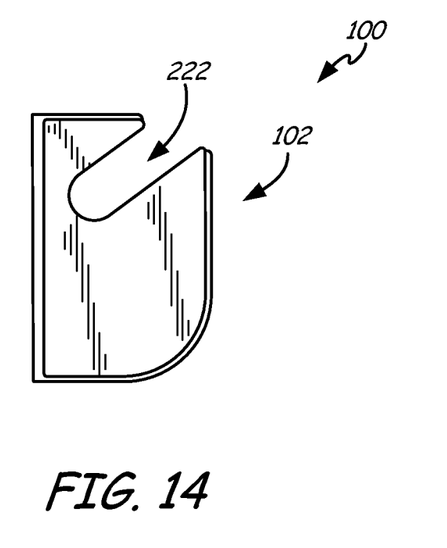
FIG. 14 illustrates a left side view of the second configuration of the mounting system illustrated in FIG. 11.
Figure 15:
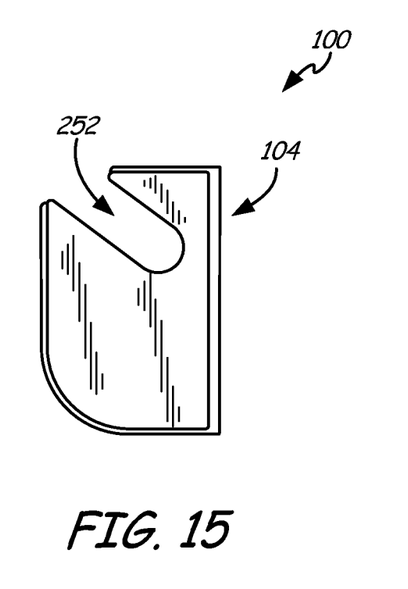
FIG. 15 illustrates a right side view of the second configuration of the mounting system illustrated in FIG. 11.
Figure 16:
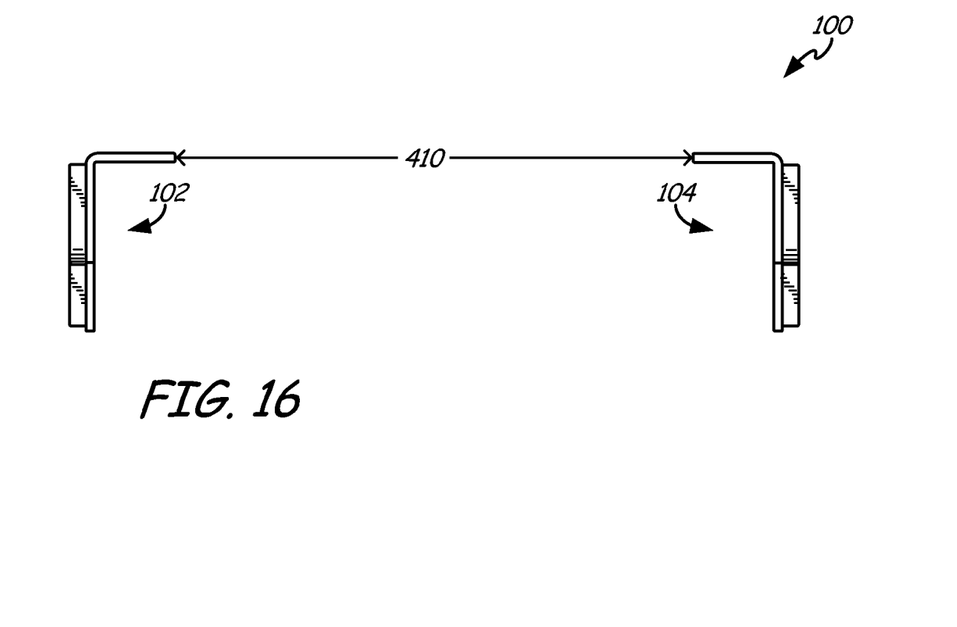
FIG. 16 illustrates a top view of the second configuration of the mounting system illustrated in FIG. 11.
Figure 17:
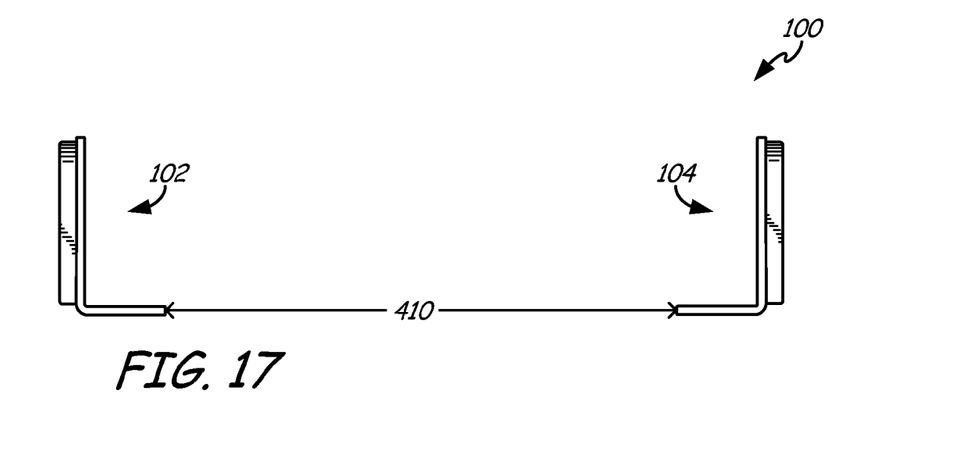
FIG. 17 illustrates a bottom view of the second configuration of the mounting system illustrated in FIG. 11.

FIG. 10 illustrates a perspective view of the first configuration of the mounting system 100 illustrated in FIGS. 1-7 with exemplary sporting equipment 300 being supported by the mounting system. As illustrated, exemplary sporting equipment 300 is a skateboard having a pair of trucks or axles 302 and 303, which support wheels 304, and a deck 306. In FIGS. 1-7 and 10, first wall mount 102 and second wall mount 104 are mounted or attached to support structure (e.g., a wall) 114 such that side edge 128 of mounting portion 116 is in contact with or touching side edge 148 of mounting portion 136. In such an arrangement, one of the pairs of trucks 302 or 303 of the skateboard is deposited into or received by receiving slots 202 (FIG. 8) and 222 (FIG. 4) of first wall mount 102 and by receiving slots 232 (FIG. 9) and 252 (FIG. 5) of second wall mount 104. In other words, receiving slots 202 and 222 of first wall mount 102 and receiving slots 232 and 252 of second wall mount 104 receive the same portion (i.e., the truck) of the sporting equipment, but at different locations along the same portion (i.e., at a first location along the truck and at a second location along the truck). In this configuration, deck 306 of the skateboard is oriented substantially vertical for display.

Figure 18:
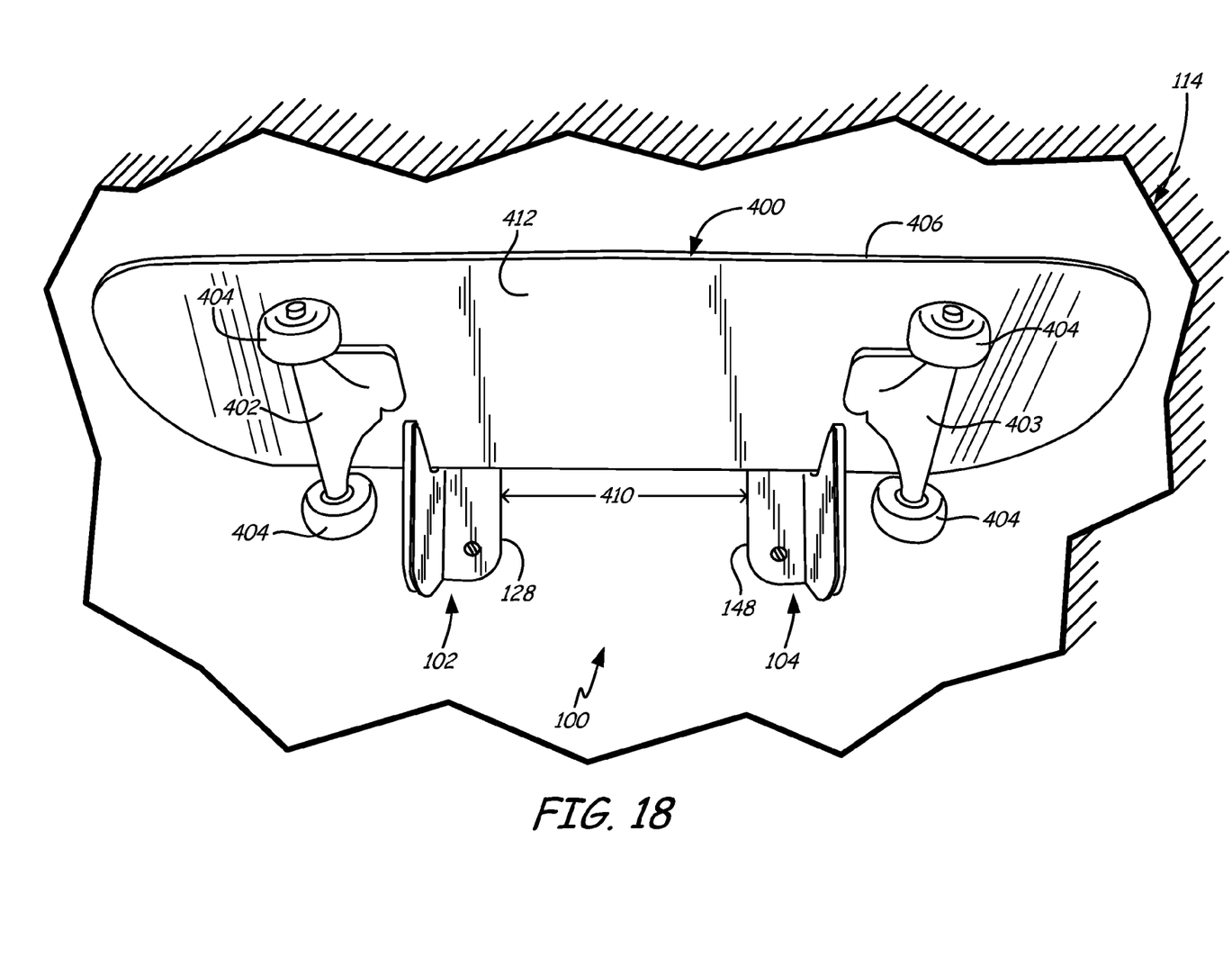
FIG. 18 illustrates a perspective view of the second configuration of the mounting system illustrated in FIG. 1 with exemplary sporting equipment being supported by the mounting system.

FIG. 18 illustrates a perspective view of the second configuration of the mounting system 100 illustrated in FIG. 11-17 with exemplary sporting equipment 400 being supported by the mounting system. As illustrated, exemplary sporting equipment 400 is a skateboard having a pair of trucks or axles 402 and 403, which support wheels 404, and a deck 406. In FIGS. 10-18, first wall mount 102 and second wall mount 104 are mounted or attached to support structure (e.g., a wall) 114 such that side edge 128 of mounting portion 116 is located a spaced distance 410 from side edge 148 of mounting portion 136. In such an arrangement, deck 406 of the skateboard is deposited into or received by receiving slots 202 (FIG. 8) and 222 (FIG. 4) of first wall mount 102 and by receiving slots 232 (FIG. 9) and 252 (FIG. 5) of second wall mount 104. In other words, receiving slots 202 and 222 of first wall mount 102 and receiving slots 232 and 252 of second wall mount 104 receive the same portion (i.e., the deck) of the sporting equipment, but at different locations along the same portion (i.e., at a first location along the deck and at a second location along the deck). In this configuration, the skateboard is mounted such that a bottom surface 412 of deck 406 is displayed for viewing. In addition, deck 406 of the skateboard is oriented substantially horizontal.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mounting system comprising:
   a first wall mount comprising:
      a first support piece made of a single, continuous material including a mounting flange and a protruding flange, the protruding flange having an outwardly facing surface, an inwardly facing surface, a top edge, a bottom edge, a front edge, and a first slot, the first slot being defined by:
         an upper edge that intersects with the top edge of the protruding flange; and
         a lower edge that intersects with the front edge of the protruding flange;
         wherein the upper edge is substantially parallel with the lower edge;
      a first end piece including a mounting surface attached to the outwardly facing surface of the protruding flange of the first support piece, an opposing surface and a first slot that corresponds with the first slot in the first support piece, the first slot defined by:
         an upper edge that intersects with a top edge of the first end piece; and
         a lower edge that intersects with a front edge of the first end piece; and
         wherein the upper edge of the first slot of the first end piece is substantially parallel with the lower edge of the first slot of the first end piece.

2. The mounting system of claim 1, the upper edge of the first slot of the first support piece intersects with the top edge of the first support piece at a first angle, the lower edge of the first slot of the first support piece intersects with the front edge of the first support piece at a second angle and a connecting edge connects the upper edge of the first slot of the first support piece to the lower edge of the first slot of the first support piece, wherein a sum of the first angle and the second angle is substantially equal to 90 degrees.

3. The mounting system of claim 2, wherein the second angle is greater than the first angle.

4. The mounting system of claim 1, further comprising a second wall mount comprising:
   a second support piece made of a single, continuous material including a mounting flange and protruding flange, the protruding flange having an outwardly facing surface for receiving the mounting surface of the second end piece, an inwardly facing surface, a top edge, a bottom edge, a front edge and a second slot, the second slot being defined by:
      an upper edge that intersects with the top edge of the protruding flange;
      a lower edge that intersects with the front edge of the protruding flange;
      wherein the lower edge has a length that is greater than a length of the upper edge; and
   a second end piece including a mounting surface attached to the outwardly facing surface of the protruding flange of the second support piece, an opposing surface and a second slot that corresponds with the second slot of the second support piece.

5. The mounting system of claim 4, wherein the mounting flange of the first wall mount extends from the inwardly facing surface of the protruding flange of the first wall mount.

6. The mounting system of claim 5, wherein the mounting flange of the second wall mount extends from the inwardly facing surface of the protruding flange of the second wall mount.

7. The mounting system of claim 4, wherein the first slot of the first support piece and the second slot of the second support piece are configured to receive a portion of sporting equipment, wherein the first slot of the first support piece receives the portion of the sporting equipment at a first location along the portion of the sporting equipment and the second slot of the second support piece receives the portion of the sporting equipment at a second location along the portion of the sporting equipment.

8. The mounting system of claim 1, wherein the upper edge of the first slot in the first support piece is spaced apart from the lower edge of the first slot in the first support piece by a first distance and the upper edge of the first slot in the first end piece is spaced apart from the lower edge of the first slot in the first end piece by a second distance, the first distance being greater than the second distance.

9. A mounting system comprising:
   a base member comprising:
      a mounting flange having a mounting surface and an opposing surface;

a protruding flange having an outer facing surface, an inner facing surface and a slot for receiving a portion of sporting equipment, the slot including an upper edge spaced apart from a lower edge by a first distance; and a faceplate member attached to the outer facing surface of the protruding flange and having a slot that corresponds with the slot in the protruding flange for receiving the portion of the sporting equipment, the slot in the faceplate member including an upper edge spaced apart from a lower edge by a second distance; and wherein the first distance is less than the second distance.

10. The mounting system of claim 9, wherein the upper edge of the slot in the protruding flange is substantially parallel with the lower edge of the slot in the protruding flange.

11. The mounting system of claim 9, wherein the upper edge of the slot in the faceplate member is substantially parallel with the lower edge of the slot in the faceplate member.

12. A mounting system comprising:

a first base member formed of a single, continuous material and configured to mount to a support structure, the first base member comprising:

a mounting portion having a mounting surface and an opposing surface; and a receiving portion oriented substantially perpendicular to the mounting portion and having a leftward facing surface, a rightward facing surface, a top edge, a bottom edge and a front edge, the receiving portion configured to receive a portion of sporting equipment and including a receiving slot defined by:

an upper edge that extends linearly and intersects with the top edge of the receiving portion at a first angle, wherein the upper edge provides a first region that contacts the sporting equipment when the sporting equipment is held in the receiving slot;

a lower edge spaced apart from the upper edge that intersects with the front edge of the receiving portion at a second angle, wherein the intersection of the lower edge and the front edge of the receiving portion provides a second region that contacts the sporting equipment when the sporting equipment is held in the receiving slot;

a connecting edge that connects the upper edge to the lower edge;

wherein a length of the lower edge of the receiving slot is greater than a length of the upper edge of the receiving slot; and wherein the first region is lower than the second region.

13. The mounting system of claim 12, wherein the second angle is greater than the first angle.

14. The mounting system of claim 12, wherein at least a portion of the bottom edge of the receiving portion is substantially parallel with the top edge and substantially perpendicular to the front edge of the receiving portion.

15. The mounting system of claim 12, further comprising a second base member configured to mount to the support structure, the second base member comprising:

a mounting portion having a mounting surface and an opposing surface; and a receiving portion oriented substantially perpendicular to the mounting portion and having a leftward facing surface, a rightward facing surface, a top edge, a bottom edge and a front edge, the receiving portion configured to receive a portion of sporting equipment and includes a receiving slot defined by:

an upper edge that extends linearly and intersects with the top edge of the receiving portion at a first angle, wherein the upper edge provides a first region that contacts the sporting equipment when the sporting equipment is held in the receiving slot;

a lower edge spaced apart from the upper edge that intersects with the front edge of the receiving portion at a second angle, wherein the intersection of the lower edge and the front edge of the receiving portion provides a second region that contacts the sporting equipment when the sporting equipment is held in the receiving slot;

a connecting edge that connects the upper edge to the lower edge;

wherein a length of the lower edge of the receiving slot is greater than a length of the upper edge of the receiving slot; and wherein the first region is below the second region.

16. The mounting system of claim 15, wherein the mounting portion of the first base member extends in a rightward direction from the receiving portion of the first base member.

17. The mounting system of claim 15, wherein the mounting portion of the second base member extends in a leftward direction from the receiving portion of the second base member.

18. The mounting system of claim 15, wherein the receiving slot of the first base member and the receiving slot of the second base member receive the same portion of the sporting equipment, but at different locations along the portion of the sporting equipment.

19. The mounting system of claim 15, comprising a first faceplate member attached to the leftward facing surface of the receiving portion of the first base member and a second faceplate member attached to the rightward facing surface of the receiving portion of the second base member.

\* \* \* \* \*